(12) United States Patent
Nishimoto

(10) Patent No.: US 7,248,422 B2
(45) Date of Patent: Jul. 24, 2007

(54) LENS BARREL

(75) Inventor: Naoki Nishimoto, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 11/406,247

(22) Filed: Apr. 19, 2006

(65) Prior Publication Data

US 2006/0256455 A1    Nov. 16, 2006

(30) Foreign Application Priority Data

Apr. 20, 2005    (JP)    ............................ P.2005-122750

(51) Int. Cl.
*G02B 7/02*    (2006.01)
(52) U.S. Cl. ........................ 359/830; 359/819; 359/822
(58) Field of Classification Search ................ 359/830, 359/819, 821, 822, 823, 824, 825, 826, 827, 359/829

See application file for complete search history.

(56) References Cited

FOREIGN PATENT DOCUMENTS

JP    2004-054186 A    2/2004

*Primary Examiner*—Timothy Thompson
(74) *Attorney, Agent, or Firm*—Birch, Stewart, Kolasch & Birch, LLP

(57) ABSTRACT

A lens barrel is provided and includes a barrel main body; lens frames supported by the barrel main body so as to be movable in the direction of an optical axis; a focus ring and a zoom ring which are rotatably supported by the barrel main body and move the lens frames in the direction of the optical axis; and a diaphragm device attached to the barrel main body. The focus ring and the zoom ring come into contact with a rotation regulatory section of the diaphragm device, whereby rotation of the focus ring and rotation of the zoom ring are regulated.

6 Claims, 5 Drawing Sheets

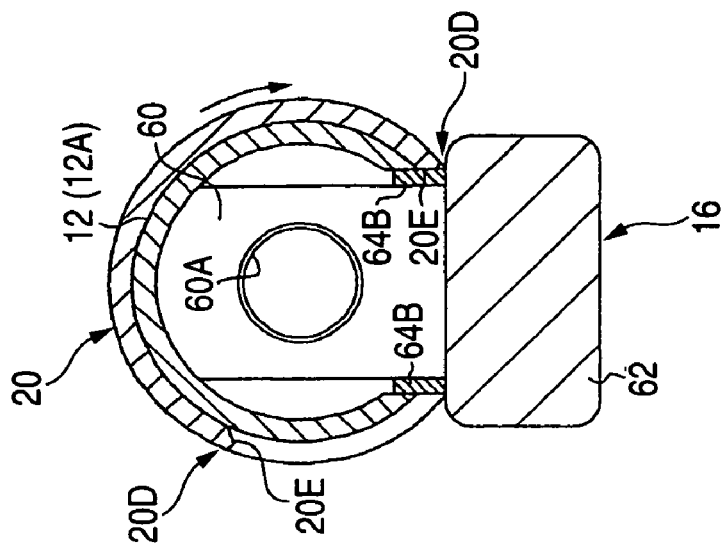
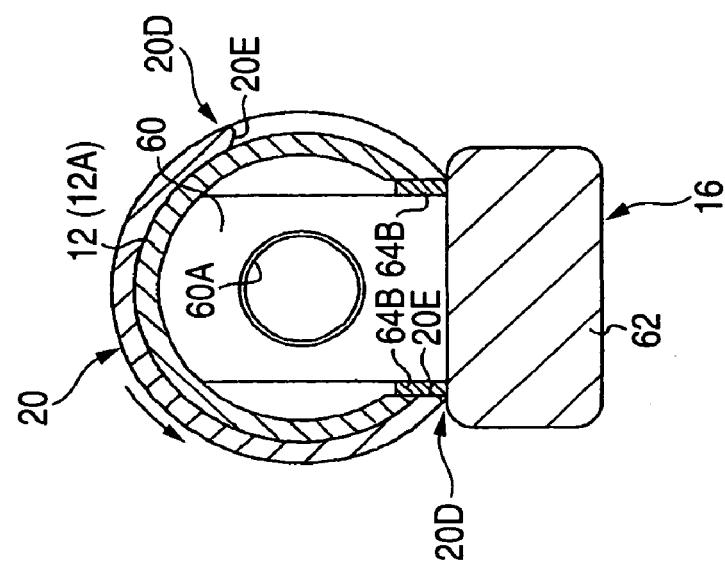
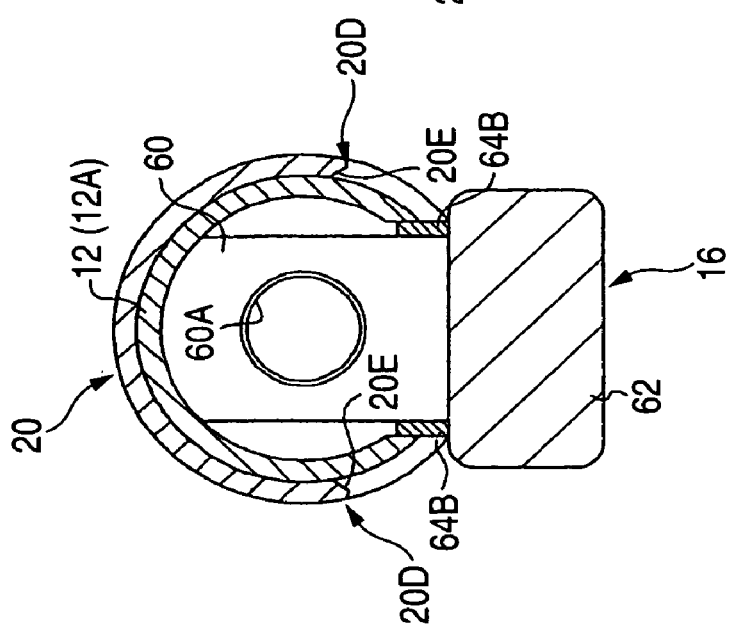

LENS BARREL

FIELD OF THE INVENTION

The present invention relates to a lens barrel, and particularly, a lens barrel attached to a surveillance camera.

BACKGROUND OF THE INVENTION

Operation rings, such as a focusing ring and a zoom ring, are rotatably provided around the outer periphery of the main body of a lens barrel of a surveillance camera which involves manual focusing operation, manual zooming operation, and the like. Focusing or zooming is performed by means of rotationally operating the operation ring (see, e.g., JP-A-2004-54186).

The lens barrel having such operation rings is provided with rotation regulation means for regulating rotational ranges of the operation rings. The rotation regulation means is formed from, e.g., a rotation regulatory pin projectingly provided on the operation ring, and a groove for the main body of the barrel with which the pin is engaged. As a result of the pin coming into contact with the end of the groove, the rotational range of the operation ring is regulated. The pin for use in regulating rotation is usually formed into a self-tapping screw. The pin is fastened as a result of being screwed into the operation ring made of resin.

However, the related-art lens barrel has the potential risk of the rotation regulation pin being fixed in an inclined manner when the pin is inserted into the operation ring. When the pin is fixed in an inclined manner, the operation angle of the operation ring becomes inaccurate, and there arises a problem of focusing or zooming being adversely affected.

Since the related-art lens barrel requires the rotation regulatory pin and the groove, there exists a problem of the lens barrel becoming bulky or an increase arising in the cost of the lens barrel.

SUMMARY OF THE INVENTION

An object of an illustrative, non-limiting embodiment of the invention is to provide a lens barrel, which enables accurate regulation of rotation of the operation ring and requires a smaller number of components.

The following means can achieve the above-described object.

(1) A lens barrel including: a barrel main body; a lens frame which is supported by the barrel main body so as to be movable in a direction of an optical axis of the lens barrel; an operation ring which is rotatably supported by the barrel main body and moves the lens frame in the direction of the optical axis; and a diaphragm device attached to the barrel main body, wherein the operation ring comes into contact with a portion of the diaphragm device, whereby rotation of the operation ring is regulated.

According to the embodiment of (1), a portion of the diaphragm device is utilized for regulating rotation of the operation ring. Hence, the rotation of the operation ring can be regulated without involvement of an increase in the number of components, and the device can be made compact and inexpensive.

According to the embodiment of (1), rotation of the operation ring is regulated by use of a portion of the diaphragm device. Hence, there is no risk of the operation angle of the operation ring becoming inaccurate. Namely, the diaphragm device is positioned and attached to the barrel main body, and hence the rotation of the operation ring is regulated by use of a portion of this diaphragm device, whereby rotation of the operation ring is regulated within an accurate range.

(2) The lens barrel according to (1) is characterized in that the diaphragm device is inserted into and attached to an opening in a peripheral surface of the barrel main body.

According to the embodiment of (2), the diaphragm device is inserted into and attached to the opening formed in the peripheral surface of the barrel main body. Accordingly, the diaphragm device can be attached to the barrel main body after the operation ring has been attached to the barrel main body. After the operation ring has been attached, the rotation of the operation ring is regulated by attaching the diaphragm device, so that the ease of assembly of the lens barrel can be enhanced.

(3) The lens barrel according to (1) or (2) is characterized in that the operation ring has a step section at an end face thereof, and the step section is brought into contact with a portion of the diaphragm device.

According to the embodiment of (3), the step section provided on the end face of the operation ring is brought into contact with a portion of the diaphragm device, to thus regulate rotation. Accordingly, rotation can be regulated without involvement of an increase in the outer size of the operation ring.

(4) The lens barrel according to (1) or (2) is characterized in that the operation ring has a protrusion section which projects from an outer peripheral surface of the operation ring, and that the protrusion sections come into contact with a portion of the diaphragm device, whereby rotation of the operation ring is regulated.

According to the embodiment of (4), the protrusion section provided on the outer peripheral surface of the operation ring is brought into contact with a portion of the diaphragm device, whereby rotation of the operation ring is regulated. Hence, the rotation of the operation ring can be regulated without involvement of an increase in the axial length of the operation ring.

(5) The lens barrel according to any one of (1) to (4) is characterized in that the operation ring is a focus ring or a zoom ring.

(6) The lens barrel according to any one of (1) to (5) is characterized in that the operation ring comes into surface contact with a portion of the diaphragm device. Consequently, according to the embodiment of (6), sufficient strength can be ensured at a position where the operation ring and the diaphragm device contact each other. Hence, deformation of the operation ring and deformation of the diaphragm device can be prevented. Thereby, the operation angle of the operation ring can be regulated within an accurate range at all times.

According to exemplary embodiments of a lens barrel of the present invention, a portion of the diaphragm device is utilized for regulating rotation of the operation ring. Hence, rotation of the operation ring can be regulated without involvement of an increase in the number of components, and the device can be made compact and inexpensive, and the rotation range of the operation ring can be accurately regulated.

BRIEF DESCRIPTION OF THE DRAWINGS

FIGS. 3A to 3C are cross-sectional views for describing regulation of rotation of a focus ring;

DETAILED DESCRIPTION OF THE INVENTION

An exemplary embodiment of a lens barrel according to the present invention will be described herein below by reference to the accompanying drawings.

Figure 1:
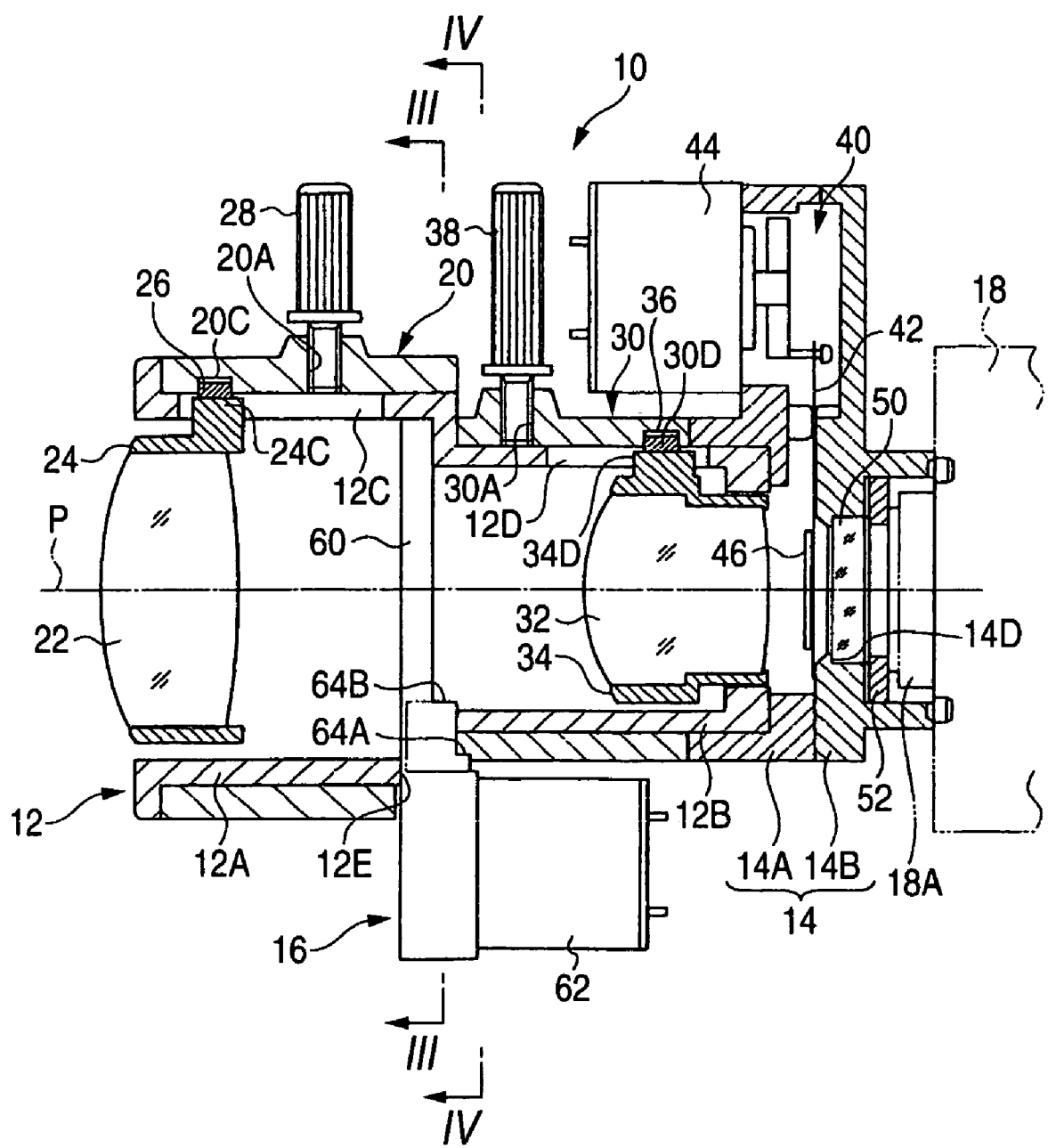
FIG. 1 is a cross-sectional view showing the configuration of a lens barrel according to an exemplary embodiment of the present invention.

FIG. 1 is a side cross-sectional view showing the configuration of a lens barrel 10 attached chiefly to a surveillance camera. The lens barrel 10 shown in the drawing primarily comprises an essentially-cylindrical barrel main body 12 (also called a "fixed barrel"); a joint member 14 (also called a "mount") which is attached to a base end portion of the barrel main body 12 and joined to a camera 18; and a diaphragm device 16 which is inserted and attached to the barrel main body 12 from the peripheral surface thereof.

The barrel main body 12 is formed from a large-diameter section 12A located at the leading-end side, and a small-diameter section 12B located on the base-end side. The large-diameter section 12A and the small-diameter section 12B are formed integrally from resin. A focus ring 20 is rotationally supported around the outer peripheral surface of the large-diameter section 12A, and a zoom ring 30 is rotationally supported around the outer peripheral surface of the small-diameter section 12B.

A focus lens (group) 22 held by a lens frame 24 is placed along an optical axis P within the large-diameter section 12A of the barrel main body 12. An engagement section 24C is projectingly provided on the outer peripheral surface of the lens frame 24. This engagement section 24C is engaged with a rectilinear groove 12C formed in the large-diameter section 12A along the direction of the optical axis P. Thereby, the lens frame 24 and the focus lens (group) 22 are movably supported along the direction of the optical axis P.

A cam pin 26 is projectingly provided on the engagement section 24C of the lens frame 24, and the cam pin 26 is engaged with a cam groove 20C formed in the inner peripheral surface of the focus ring 20. Consequently, when the focus ring 20 is rotationally actuated, the position of intersection between the cam groove 20C and the rectilinear groove 12C is displaced in the direction of the optical axis P. In association with displacement of the position of intersection, the lens frame 24 and the focus lens (group) 22 are moved in the direction of the optical axis P. Thereby, the focus lens (group) 22 is moved in the direction of the optical axis P, to thus perform focus adjustment. In order to stably move the lens frame 24, the engagement portion consisting of the engagement section 24C of the lens frame 24, the cam pin 26, the cam groove 20C of the focus ring 20, and the rectilinear groove 12C of the barrel main body 12 is preferably provided in numbers. In normal times, the engagement sections are provided at three positions which are determined by dividing the circumference into three equal parts.

A screw hole 20A, which penetrates from the outer peripheral surface to the inner peripheral surface, is formed in the focus ring 20. A knob 28 is screwed into and attached to the screw hole 20A. The operator can also rotate the focus ring 20 by use of this knob 28. The operator can push the knob 28 to thus press the tip end of the knob against the outer peripheral surface of the large-diameter section 12A of the barrel main body 12, so that the focus ring 20 can be fixed at a desired focus adjustment position.

A zoom lens (group) 32 held by the lens frame 34 is placed along the optical axis P within the small-diameter section 12B of the barrel main body 12. An engagement section 34D is projectingly provided on the outer peripheral surface of the lens frame 34, and the engagement section 34D is engaged with a rectilinear groove 12D formed in the small-diameter section 12B on the direction of the optical axis P. Thus, the lens frame 34 and the zoom lens (group) 32 are supported so as to be freely movable along the direction of the optical axis P.

A cam pin 36 is projectingly provided on the engagement section 34D of the lens frame 34, and the cam pin 36 is engaged with a cam groove 30D formed in the inner peripheral surface of the zoom ring 30. Consequently, when the zoom ring 30 is rotationally actuated, the position of intersection between the cam groove 30D and the rectilinear groove 12D is displaced in the direction of the optical axis P, and the lens frame 34 is moved in the direction of the optical axis P in association with displacement of the position of intersection. Thereby, the zoom lens 32 is moved in the direction of the optical axis P, so that the focal length (a zoom angle of view) is adjusted. The engagement portion consisting of the engagement section 34D of the lens frame 34, the cam pin 36, the cam groove 30D of the zoom ring 30, and the rectilinear groove 12D of the barrel main body 12 is preferably provided in numbers in order to stably move the lens frame 34. In normal times, the engagement portions are provided at three locations which are determined by dividing the circumference into three equal parts.

A screw hole 30A, which penetrates from the outer peripheral surface to the inner peripheral surface, is formed in the zoom ring 30, and a knob 38 is screwed and attached to the screw hole 30A. The operator can also rotate the zoom ring 30 by use of the knob 38. The operator can push the knob 38 to thus press the tip end of the knob against the outer peripheral surface of the small-diameter section 12B of the barrel main body 12, so that the zoom ring 30 can be fixed at a desired focus adjustment position.

Figure 5:
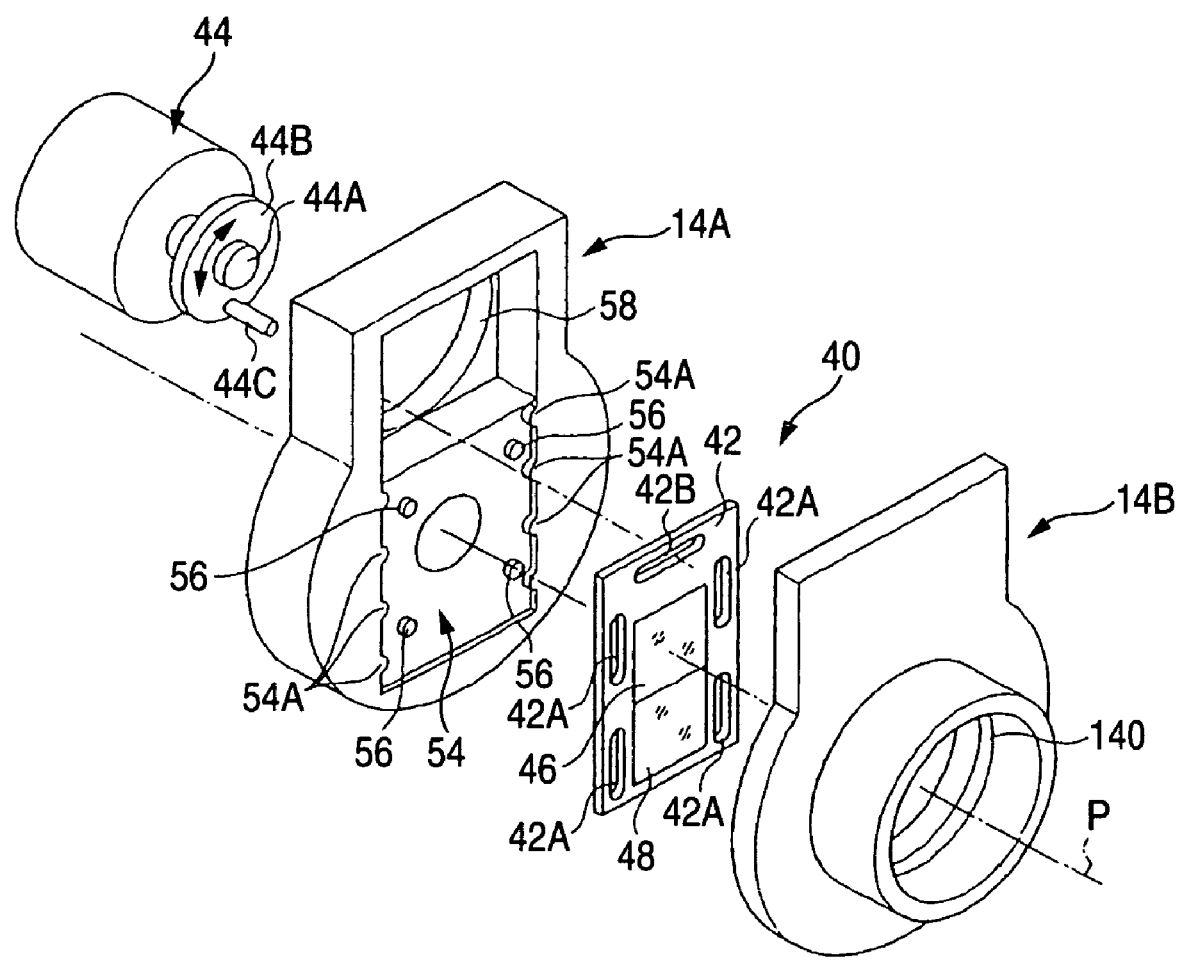
FIG. 5 is a perspective view showing the configuration of a joint member.

The joint member 14 is for joining the barrel main body 12 to the camera 18, and is fastened to the base end of the small-diameter section 12B of the barrel main body 12. An optical filter unit 40, which will be described later, is incorporated in the joint member 14, and the joint member 14 is split into two sub-divisions at the position of an IR cut filter 46 (corresponding to an optical filter) of the optical filter unit 40. Namely, as shown in FIG. 5, the joint member 14 is formed from a barrel-side member 14A which is located closer to the barrel main body 12 (i.e., a left position in FIG. 5 which is away from the viewer) than to a filter mount plate 42 of the IR cut filter 46, and a camera-side member 14B which is located closer to the camera 18 (i.e., a right position in FIG. 5 which is toward the viewer). The joint member 14 is constituted by means of joining the barrel-side member 14A to the camera-side member 14B. No specific limitations are imposed on the method for joining the barrel-side member 14A to the camera-side member 14B. For instance, a joint method using a screw or a fixing method using a snap-in structure is adopted.

The optical filter unit 40 is chiefly formed from the filter mount plate 42, and an actuator 44 for inserting or withdrawing the filter mount plate 42 in relation to the optical axis P. The IR (infrared) cut filter 46 and a dummy filter 48 are vertically aligned on the filter mount plate 42. An ND filter or a visible light cut filter may be disposed in place of the IR cut filter 46 or the dummy filter 48.

Vertically-elongated guide holes 42A, 42A, ... are formed in the filter mount plate 42. Guide pins 56, 56, ... projectingly provided on the barrel-side member 14A of the joint member 14 are inserted into and guided by the respective guide holes 42A. Thereby, the filter mount plate 42 is supported by the barrel-side member 14A so as to be vertically slidable.

A laterally-elongated hole 42B is formed in an upper portion of the filter mount plate 42, and an arm 44C of the actuator 44 is inserted into and guided by the elongated hole 42B.

The main body of the actuator 44 is attached to and held by an attachment section 58 formed in an upper portion of the barrel-side member 14A. No specific limitations are imposed on the method for attaching the actuator 44 to the barrel-side member 14A. Fixing involving use of a screw or the snap-in structure is employed.

The actuator 44 has a rotary shaft 44A, and a disk 44B is attached to the rotary shaft 44A. The arm 44C stands upright on an outer peripheral portion of the disk 44B. The elongated hole 42B of the filter mount plate 42 is inserted into and engaged with the arm 44C.

According to the optical filter unit 40 having the above configuration, when the rotary shaft 44A is rotated by driving the actuator 44, the disk 44B is rotated so that the arm 44C moves around the rotary shaft 44A. In association with movement of the arm 44C, the filter mount plate 42 is vertically moved. Thus, the optical filter placed on the optical axis P can be switched between the IR cut filter 46 and the dummy filter 48. Consequently, when photographing is performed during the daytime, the IR cut filter 46 is placed on the optical axis P. When photographing is performed during the nighttime, the dummy filter 48 is placed on the optical axis P. Thus, photographing can be performed during the daytime and during the nighttime.

As shown in FIG. 1, the barrel-side member 14A of the joint member 14 is fixed to the base end portion of the small-diameter section 12B of the barrel main body 12. No specific limitations are imposed on the method for fixing the barrel-side member 14A and the small-diameter member 12B. However, they are joined together by means of, e.g., a snap-in structure. The barrel-side member 14A needs to be positioned in relation to the focus lens 22 and the zoom lens 32, and hence machining of high precision is required.

As shown in FIG. 5, recessed sections 54 for housing the filter mount plate 42 are formed in the surface (split surface) of the barrel-side member 14A that is joined to the camera-side member 14B. The recessed sections 54 have a space where the filter mount plate 42 slides up and down. Circular-arc projection sections 54A, 54A, ..., which guide the filter mount plate 42, are projectingly formed at given intervals on the side surface of the recessed section 54. Accordingly, the filter mount plate 42 can be vertically slide while being housed in the recessed section 54.

The camera-side member 14B has a step 14D used for retaining an LPF (low-pass filter) 50 (see FIG. 1) on the optical axis P. The leading-end portion of the camera 18 is inserted while the LPF 50 is provided on the step 14D and a plate-like rubber member 52 is additionally provided. The camera 18 to be attached in the present embodiment is called a built-in type where a CCD 18A and a mount board thereof are exposed.

The camera-side member 14B to which the camera 18 is attached does not require machining of as high precision as that required by the barrel-side member 14A. However, the camera-side members 14B of various shapes must be prepared in accordance with specifications of the camera 18 (i.e., the shape, position, heat-radiation characteristic, and the like, of the CCD 18A).

The joint member 14 having the above configuration is assembled as follows. First, the joint member 14 is split into the barrel-side member 14A and the camera-side member 14B, and the barrel-side member 14A is attached to the small-diameter section 12B of the barrel main body 12. Next, the actuator 44 of the optical filter unit 40 is attached to the attachment section 58 formed in the upper portion of the barrel-side member 14A. The guide pins 56, 56, ... of the barrel-side member 14A are inserted into the guide holes 42A, 42A, ... of the filter mount plate 42, and the arm 44C of the actuator 44 is inserted into the elongated hole 42B of the filter mount plate 42, to thus attach the filter mount plate 42. Next, the camera-side member 14B is joined to the barrel-side member 14A. Thereby, the joint member 14 is attached to the base end section of the barrel main body 12, and the optical filter unit 40 is incorporated in the barrel main body 12. After the optical filter unit 40 has been incorporated into the joint member 14, the joint member 14 may be attached to the barrel main body 12.

Figure 2:
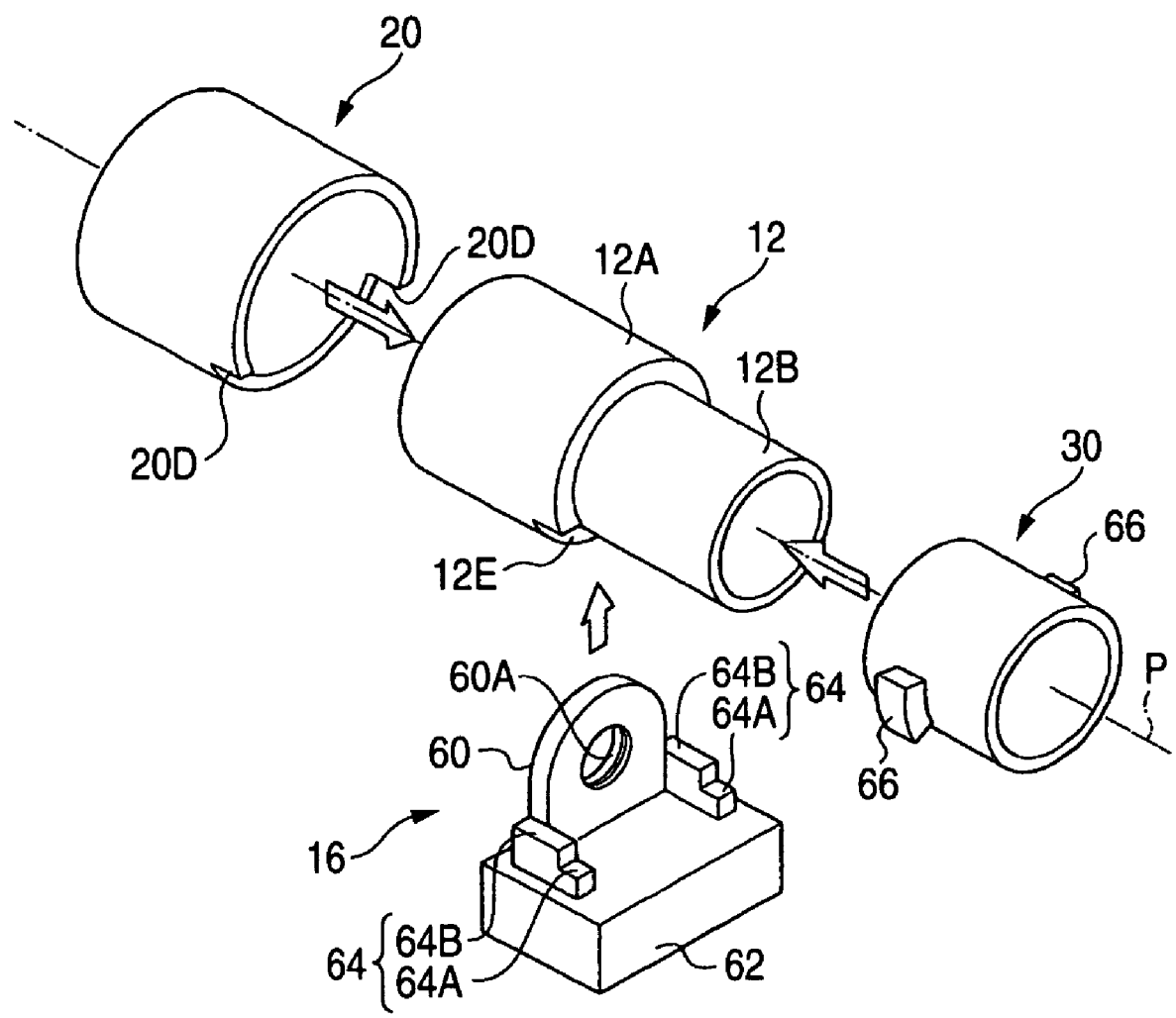
FIG. 2 is an exploded perspective view of the lens barrel.

As shown in FIG. 2, the diaphragm device 16 has a plate-like casing 60, and the casing 60 is inserted into and attached to the barrel main body 12. Specifically, a slit-like opening section 12E is formed in the circumferential direction of a boundary between the large-diameter section 12A and the small-diameter section 12B of the barrel main body 12. The plate-like casing 60 is inserted into and attached to the slit-like opening section 12E in a direction orthogonal to the optical axis P. The casing 60 and the barrel main body 12 are joined together by means of an unillustrated snap-in structure; namely, the casing 60 is provided with an elastically-deformable arm. An engagement claw is formed at the tip end of the arm. As a result of the engagement claw being fitted into the groove of the barrel main body 12, the casing 60 of the diaphragm device 16 is attached to the barrel main body 12. The method for joining the diaphragm device 16 to the barrel main body 12 is not limited to the snap-in structure. Another joining method, such as screwing involving use of screws, can also be selected.

A circular aperture 60A is formed in the casing 60. When the casing 60 is attached to the barrel main body 12, the aperture 60A is placed on the optical axis P. Further, two diaphragm vanes (not shown) are provided in the casing 60. One of the diaphragm vanes is placed at a position above the aperture 60A, and the other diaphragm vane is placed at a position below the aperture 60A. The respective diaphragm vanes are supported so as to be vertically slidable. The respective diaphragm vanes are vertically moved by means of driving a drive section (an iris meter or the like) 62 mounted at the lower end of the casing 60. By means of the diaphragm vane disposed above the aperture 60A being moved downward and the diaphragm vane disposed below the aperture 60A being moved upward, the aperture 60A is closed by the two diaphragm vanes, whereby subject light does not pass through the aperture. By means of driving the drive section 62 to thus upwardly move the upper diaphragm vane and downwardly move the lower diaphragm vane, the two diaphragm vanes are receded from the aperture 60A, so that the subject light can pass through the entirety of the aperture 60A. The configuration of the diaphragm device 16 is not limited to that described above, and an iris diaphragm mechanism or the like may also be used.

As shown in FIG. 2, the diaphragm device 16 is provided with rotation regulatory sections 64, 64. The rotation regulation sections 64, 64 regulate rotation of the operation ring, such as the focus ring 20 and the zoom ring 30. The rotation regulatory sections 64, 64 are formed in the area where the casing 60 of the diaphragm device 16 is connected to the drive section 62, so as to project outward. Each of the rotation regulatory sections 64 is formed from a focus regulation section 64B on the leading-end side and a zoom regulation section 64A on the base-end side.

The diaphragm device 16 configured as above is inserted into and attached to the opening section 12E of the barrel main body 12 after the focus ring 20 and the zoom ring 30 have been attached to the barrel main body 12. As a result, the rotation regulatory sections 64 of the diaphragm device 16 are placed at predetermined positions, and the rotation of the focus ring 20 and the rotation of the zoom ring 30 are regulated by the rotation regulatory sections 64. In detail, the rotation of the focus ring 20 is regulated by the focus regulatory section 64B, and the rotation of the zoom ring 30 is regulated by the zoom regulatory section 64A. When the diaphragm device 16 is inserted into and attached to the barrel main body 12, the rotation regulatory sections 64, 64 also serve as means for positioning the diaphragm device 16 in relation to the barrel main body 12.

Regulation of rotation of the focus ring 20 will be described hereunder by reference to FIG. 2 and FIGS. 3A to 3C. FIGS. 3A to 3C show a cross-sectional profile taken along line 3—3 shown in FIG. 1. FIG. 3A shows a state where the focus ring 20 is not rotated, and FIGS. 3B and 3C show states where the focus ring 20 is rotated in opposite directions and thereby regulated.

As shown in FIG. 2, a portion of the base-end side end face (specifically, about two-thirds of the upper portion of the end face) of the focus ring 20 protrudes, and steps 20D, 20D are formed on respective sides of the protruding portion. When the focus ring 20 is fitted to the barrel main body 12, the step sections 20D, 20D protrude from the base end of the large-diameter section 12A of the barrel main body 12 and come to the positions above the small-diameter section 12B. As shown in FIG. 3A, the step sections 20D, 20D have slope faces 20E, 20E which are obliquely cut. The slope face 20E is formed so as to come into face contact with the focus regulatory section 64B when the focus ring 20 is rotated as shown in FIG. 3B or 3C.

When the focus ring 20 that is constituted as mentioned above is rotated counterclockwise from the position shown in FIG. 3A, the slope face 20E of the step section 20D comes into contact with the focus regulatory section 64B as shown in FIG. 3B, whereby rotation of the focus ring 20 is regulated. Further, when the focus ring 20 is rotated clockwise from the position shown in FIG. 3A, the slopes 20E of the step section 20D on the other side comes into contact with the focus regulatory section 64B as shown in FIG. 3C, whereby rotation of the focus ring 20 is regulated.

The operation for rotating the focus ring 20 is regulated as a result of the step sections 20D, 20D of the focus ring 20 coming into contact with the focus regulatory section 64B of the casing 60 of the diaphragm device 16. The casing 60 of the diaphragm device 16 is attached while remaining positioned on the barrel main body 12. Hence, the focus ring 20 can be correctly regulated within the angular range by means of regulating rotation of the focus ring 20 by use of the focus regulatory section 64B of the casing 60. Thereby, the focus ring 20 can be set to an accurate operation range, so that focusing operation can be performed accurately.

According to the previously-described embodiment, the rotation of the focus ring 20 is regulated by use of a portion of the diaphragm device 16. Hence, the pin or groove for regulating rotation is obviated. When compared with a case where the pin and groove are used, the entire lens barrel 10 can be made compact, and the number of processes for assembling the lens barrel 10 can be reduced.

According to the above-described embodiment, contact between the focus ring 20 and the focus regulatory section 64B may also be point contact. The slope faces 20E of the focus ring 20 are brought into surface contact with the focus regulatory section 64B. Hence, sufficient strength can be ensured at the contact positions. Namely, deformation of the step section 20D of the focus ring 20 and deformation of the focus regulatory section 64B can be prevented, and occurrence of a displacement in the rotational range, which would otherwise be caused by deformation, can be prevented.

Figure 4A:
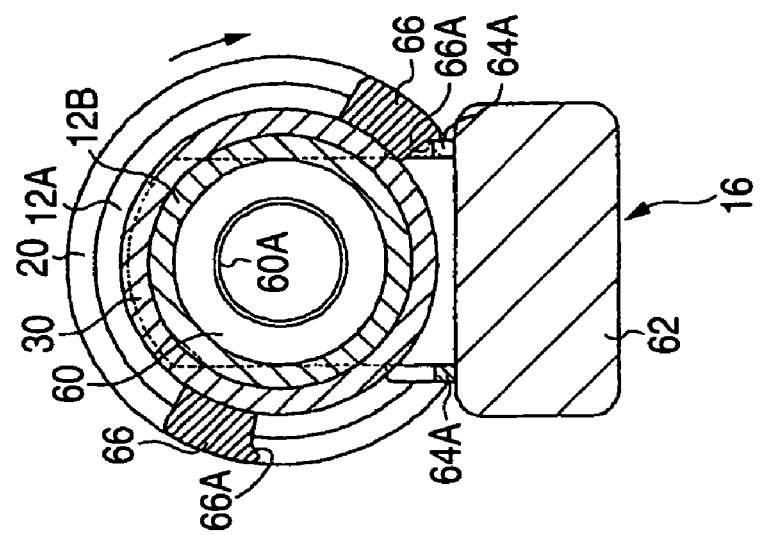
FIG. 4A to 4C are cross-sectional views for describing regulation of rotation of a zoom ring.
Figure 4B:
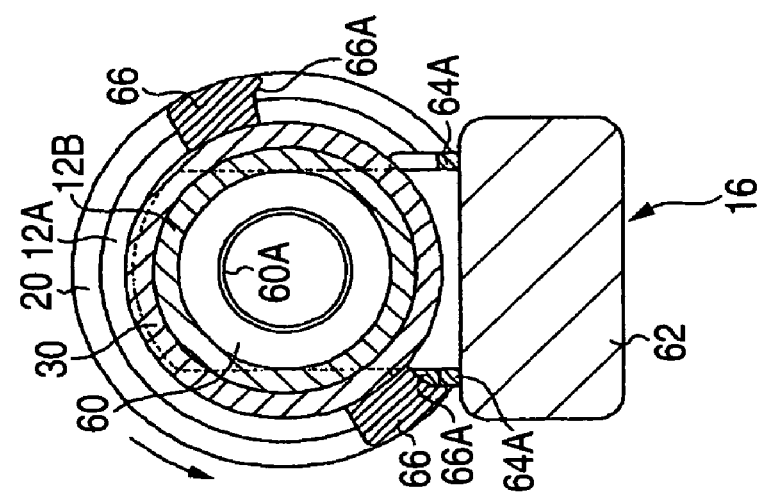
Figure 4C:
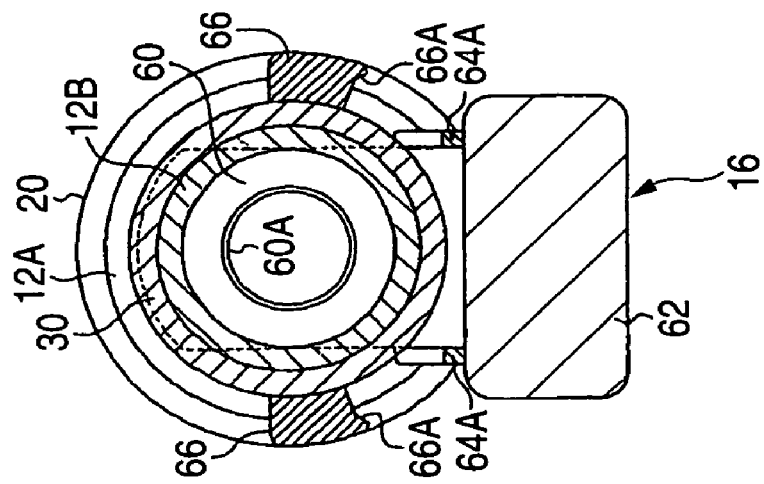

Regulation of rotation of the zoom ring 30 will now be described by reference to FIG. 2 and FIGS. 4A to 4C. FIGS. 4A to 4C show a cross-sectional profile taken along line 4—4 shown in FIG. 1. FIG. 4A shows a state where the zoom ring 30 is not rotated, and FIGS. 4B and 4C show states where the zoom ring 30 is rotated in opposite directions and thereby regulated.

As shown in FIG. 4A, a protrusion section 66, which protrudes from the outer peripheral surface, is provided on the zoom ring 30. This protrusion section 66 is formed from, e.g., resin, and integrally with the zoom ring 30. As shown in FIG. 4A, the protrusion section 66 is preferably formed within the range which is smaller than the focus ring 20. Moreover, as shown in FIG. 4B or 4C, contact faces 66A, 66A, which come into surface contact with the zoom regulatory sections 64A, 64A when the zoom ring 30 is rotated, are formed on the protrusion section 66.

When the zoom ring 30 that is configured as mentioned above is rotated counterclockwise from the position shown in FIG. 4A, the protrusion sections 66 come into contact with the zoom regulatory sections 64 as shown in FIG. 4B, to thus regulate rotation of the zoom ring 30. When the zoom ring 30 is rotated clockwise from the position shown in FIG. 4A, the protrusion sections 66 come into contact with the zoom regulatory sections 64A as shown in FIG. 4C, to thus regulate rotation of the zoom ring 30.

As mentioned above, the rotation of the zoom ring 30 is regulated as a result of the protrusion sections 66, 66 of the zoom ring 30 coming into contact with the zoom regulatory sections 64A of the casing 60 of the diaphragm device 16. The casing 60 of the diaphragm device 16 is attached to the barrel main body 12 while being positioned on the same, and hence rotation of the zoom ring 30 is regulated by use of the zoom regulatory sections 64A of the casing 60, so that the zoom ring 30 can be regulated to the accurate angular range. Thereby, the accurate operation range can be set for the zoom ring 30, and zoom operation can be performed accurately.

According to the above-described embodiment, rotation of the zoom ring 30 is regulated by utilization of a portion of the diaphragm device 16, which obviates the necessity for the rotation regulatory pin or groove. When compared with the case where the pin and the groove are used, the entire lens barrel 10 can be made compact, and the number of processes of assembling the lens barrel 10 can be diminished.

According to the embodiment, the contact between the zoom ring 30 and the zoom regulatory sections 64A may be point contact. However, the contact faces 66A of the zoom ring 30 are brought into surface contact with the zoom regulatory section 64A, and hence sufficient strength can be ensured at the contact positions. Specifically, deformation of the protrusion sections 66 of the zoom ring 30 and deformation of the zoom regulatory sections 64A can be prevented, and occurrence of a displacement of the rotation range, which would otherwise be caused by deformation, can be prevented.

In the above embodiment, in order to effect contact with the rotation regulatory sections 64 of the diaphragm device 16, the step sections 20D are provided at the end face of the focus ring 20, and the protrusion sections 66 are provided on the outer peripheral surface of the zoom ring 30. In contrast, the protrusion sections may be provided on the outer peripheral surface of the focus ring 20, to thus bring the protrusion sections into contact with the rotation regulation sections 64, and the step sections may be provided at the end face of the zoom ring 30, to thus bring the step sections into contact with the rotation regulatory sections 64.

The shapes of the operation rings, such as the focus ring 20, the zoom ring 30, and the like, are not limited to those mentioned in connection with the above embodiment. Any shape is acceptable, so long as the shape comes into contact with the rotation regulatory sections 64 of the diaphragm device 16 at the predetermined positions. Consequently, for instance, a slit-shaped opening, which is larger than the casing 60 of the diaphragm device 16 with respect to the circumferential direction, may be formed in the peripheral surface of the operation ring, and the casing 60 may be inserted into and attached to the opening. In this case, the end section of the slit-shaped opening of the operation ring in the circumferential direction comes into contact with the casing 60, to thus regulate the rotation range of the operation ring.

In the embodiment, the focus regulatory section 64B and the zoom regulatory section 64A are formed integrally, but they are not limited to this form. They may be formed separately from each other.

In the above embodiment, the rotation regulatory sections 64 are projectingly formed on the diaphragm device 16. However, the rotation regulatory section is not limited to this form. Rotation may be regulated by bringing the operation ring into direct contact with the casing 60 of the diaphragm device 16 or the like.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-122750 filed Apr. 20 of 2005, the contents of which is incorporated herein by reference.

What is claimed is:

1. A lens barrel comprising:
    a barrel main body;
    a lens frame supported by the barrel main body so as to be movable in a direction of an optical axis of the lens barrel;
    an operation ring rotatably supported by the barrel main body and moves the lens frame in the direction of the optical axis; and
    a diaphragm device attached to the barrel main body,
    wherein the operation ring comes into contact with a portion of the diaphragm device so that rotation of the operation ring is regulated.

2. The lens barrel according to claim 1, wherein the diaphragm device is inserted into and attached to an opening in a peripheral surface of the barrel main body.

3. The lens barrel according to claim 1, wherein the operation ring has a step section at an end face thereof, and the step section comes into contact with a portion of the diaphragm device.

4. The lens barrel according to claim 1, wherein the operation ring has a protrusion section projecting from an outer peripheral surface of the operation ring, and the protrusion section comes into contact with a portion of the diaphragm device so that rotation of the operation ring is regulated.

5. The lens barrel according to claim 1, wherein the operation ring is one of a focus ring and a zoom ring.

6. The lens barrel according to claim 1, wherein the operation ring comes into surface contact with a portion of the diaphragm device.

* * * * *